United States Patent [19]
Epstein et al.

[11] Patent Number: 5,621,264
[45] Date of Patent: Apr. 15, 1997

[54] WATER CRAFT USING PIEZOELECTRIC MATERIALS

[75] Inventors: Michael Y. Epstein, Somerset County; George W. Taylor, Mercer County, both of N.J.

[73] Assignee: Ocean Power Technologies, Inc., West Trenton, N.J.

[21] Appl. No.: 511,761

[22] Filed: Aug. 7, 1995

[51] Int. Cl.⁶ .................................................. H01L 41/08
[52] U.S. Cl. .................................................. 310/339; 310/371
[58] Field of Search .................................. 310/337, 339, 310/371, 317, 319, 344; 60/499, 501; 290/53

[56] References Cited

U.S. PATENT DOCUMENTS

| | | | |
|---|---|---|---|
| 3,064,137 | 11/1962 | Corbett et al. | 290/53 |
| 3,239,678 | 3/1966 | Kolm et al. | 310/339 |
| 3,774,048 | 11/1973 | Hardingham | 290/42 |
| 4,185,621 | 1/1980 | Morrow | 310/339 |
| 4,186,323 | 1/1980 | Cragg et al. | 310/324 |
| 4,387,318 | 6/1983 | Kolm et al. | 310/339 |
| 4,402,524 | 9/1983 | D'Antonio et al. | 280/612 |
| 4,404,490 | 9/1983 | Taylor et al. | 310/339 |
| 4,467,236 | 8/1984 | Kolm et al. | 310/339 |
| 4,515,997 | 5/1985 | Stinger | 179/111 R |
| 4,984,449 | 1/1991 | Caldwell et al. | 73/49.2 |
| 5,305,507 | 4/1994 | Dvorsky et al. | 310/340 |
| 5,432,396 | 7/1995 | Sato et al. | 310/337 |

*Primary Examiner*—Thomas M. Dougherty
*Attorney, Agent, or Firm*—Michael Y. Epstein; Henry I. Schanzer

[57] ABSTRACT

A flexible layer of piezoelectric material, e.g., a known PVDF polymer, is used for generating electrical energy for use on a water craft. In one arrangement, the sheet is laminated within a craft hull of fiberglass. Electrodes are provided for the major opposite surfaces of the layer, and an encapsulating material, e.g., fiberglass or a layer of the polymer itself, comprises the water contacting, exterior surface of the hull. In salt water, the water is one electrode, and an outer encapsulating layer is omitted. Spaced apart air pockets are optionally provided along the polymer sheet for increasing the flexing thereof in response to passing water and for inducing turbulence in the passing water. Elongated, flexible and electroded sheets, optionally including air pockets, are towed behind or beneath the craft, or are flown from a mast on the craft.

9 Claims, 3 Drawing Sheets

WATER CRAFT USING PIEZOELECTRIC MATERIALS

BACKGROUND OF THE INVENTION

This invention relates to water crafts, particularly small vessels such as sailboats and dinghies, and to the use of piezoelectric materials for generating electrical energy for use on such crafts.

The present invention has particular utility with regard to a problem particularly prevalent in small pleasure crafts, namely, the safe and efficient provision of electrical energy over extended periods of time during which only relatively small quantities of electrical power are required. For reasons of safety, all water crafts are required to, or at least sensibly should, carry navigation lights, that is, small lights designed not particularly for purposes of on-board illumination, but for rendering the crafts visible to other craft at night and in poor weather. Such lights consume energy over prolonged periods of time and, although of small wattage, do require significant amounts of electrical energy. The problem, particularly in small crafts where even a small motor generator is undesirable for reasons of cost, safety, space requirements, noise and the like, is that the only practical presently available source of electrical energy is the common lead storage battery. Such batteries, however, require re-charging or periodic replacement, and require, in the absence of on-board charging means, frequent interruptions in the otherwise continuous usage of the crafts. Also, even with small on-board motor generator means for trickle charging the batteries for maintaining them continuously charged, the need to carry fuel for the generator motor and the noise and fumes therefrom are generally objectionable.

SUMMARY OF THE INVENTION

For solving the aforementioned problem in accordance with one aspect of this invention, a piezoelectric element, preferably in the form of a plastic film, is disposed on or laminated within the hull of a water craft. Electrodes are provided on opposite surfaces of the film and, in response to vibrations of the hull, mechanical energy transmitted to the piezoelectric film is converted to electrical energy which is transmitted from the film via the electrodes. In one embodiment, the plastic film is directly exposed to the water and is provided with spaced apart protrusions, e.g., air pockets or bubbles. During movement of the film through the water, the protrusions disrupt laminar water flow and cause turbulent flow for mechanically vibrating the film for generating electricity.

In accordance with a second aspect of the invention, one or more piezoelectric elements, preferably in the form of elongated, highly flexible strips, are towed behind or beneath the craft, or "flown" from a mast or the like on the craft.

DESCRIPTION OF PREFERRED EMBODIMENTS OF THE INVENTION

Figure 1:
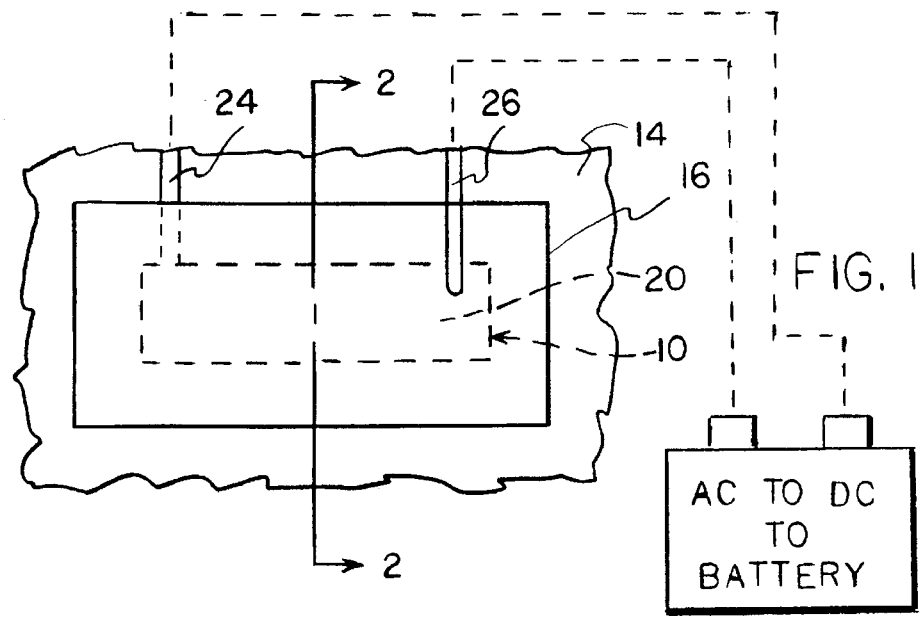
FIG. 1 is a side elevation of a portion of a hull having a piezoelectric generator mounted thereon.

As previously indicated, the invention makes use of piezoelectric elements. Materials having piezoelectric properties are well known and comprise materials which, in response to mechanically induced strains (i.e., dimensional variations), generate electrical charges throughout the volume of the strained material in proportion to the mechanical energy used to strain the material. By providing electrodes on spaced apart surfaces of the material, the electrical charges can be collected for generating electrical energy. By alternately straining and destraining the material, A.C. electrical energy is generated.

Numerous piezoelectric materials are known, but certain piezoelectric materials are particularly well suited for use with the invention. Such materials comprise certain polymers which can be cast in the form of large but thin plastic sheets. Particularly, polymers known as PVDF polymers can be used. PVDF stands for poly vinylidene fluoride. By "PVDF polymer" is meant either the PVDF polymer by itself or various copolymers comprising PVDF and other polymers, e.g., a copolymer referred to as P(VDF-TrFE) and comprising PVDF and PTrFE (poly trifluoroethylene).

Such PVDF polymers are known, commercially available materials having various commercial applications, e.g., as dielectric materials for capacitors. Although these materials, as commonly used, are simple dielectrics having no piezoelectric properties, such properties can be provided when the materials are properly "poled." By "poled" is meant that electric dipoles in the materials, which dipoles are normally randomly oriented, are identically oriented within the materials. This is accomplished by heating the materials, to enhance the mobility of the dipoles, and applying a relatively large voltage across the materials to cause all the dipoles to identically align themselves along the electrostatic field lines provided by the D.C. voltage. Then, the materials are cooled and, when the dipole mobility is low, the voltage is removed for permanently "freezing" in place the aligned dipoles.

An important advantage of such PVDF polymers in connection with the present invention is that they can be applied in a number of different ways to the hulls of water crafts.

For example, the P(VDF-TrFE) copolymer can be prepared as a fluid and applied to a surface by a "spin-on process", or by painting, spraying, or the like, all of which processes are known. After drying, the resulting sheet can be poled as above described. The PVDF monopolymer can also be applied as a fluid, but the poling process of such polymer also requires stretching of the film while it is being poled, which, of course, can present problems when the material is applied to an existing hull surface.

Additionally, both the aforementioned PVDF polymers are commercially available as large, thin sheets including thin electrodes of various metals, e.g., silver, aluminum, copper and tin, as well as known conductive inks, on opposite major surfaces thereof. The sheets are relatively strong and tear resistant, flexible and chemically inert and such PVDF polymer piezoelectric materials are ideal for being applied to the hulls of vessels for forming either the inner or outer surfaces of the hulls or being laminated within the hulls. When flexibility is particularly important, as generally so in connection with the present invention, the metal electrodes (if used, see hereinafter) can be of metals having high ductility, e.g., tin and silver, and, preferably, of a known conductive ink including, for example, carbon black or silver particles.

The invention has particular utility in connection with hulls made of fiberglass. Typically, such fiberglass hulls are made by applying successive layers of fiberglass, e.g., using a spin-on process, painting or spraying, until a desired wall thickness is achieved. As part of such process, in accordance with one embodiment of the invention, a piezoelectric element 10 (FIGS. 1 and 2), particularly an electroded sheet including a poled layer 12 of a PVDF polymer, is applied to a fiberglass wall 14 of a hull prior to the final layer (or layers), and the final layer of fiberglass 16 is applied over the PVDF polymer layer 12 for hermetically and firmly securing it in place.

If the PVDF polymer (preferably the aforementioned P(VDF-TrFE) co-polymer, to avoid the need for stretching during poling) is applied as a fluid and then dried, a thin metallic layer 18, such as tin or a conductive ink, is first applied to the fiberglass wall 14, as by painting or spraying. The polymer layer 12 is applied over the metallic layer 18 and covered, in turn, with a second metallic layer 20. The polymer layer 12 is then poled, as previously described. The final fiberglass layer 16 is applied over the second metallic layer 20 as well as the edges 22 of the polymer layer 12.

As illustrated, the two metallic layers 18 and 20 are electrically contacted by terminals 24 and 26, respectively, which extend through the covering layer 16 and upwardly along the hull outer wall 14. Although not shown, the terminals 24 and 26 are also hermetically encapsulated except for exposed ends for electrical interconnection.

If the PVDF polymer is in the form of an electroded sheet, it can be bonded, e.g., by a known epoxy cement, to the fiberglass wall 14, and the final layer(s) of fiberglass 16 applied thereover. If the fiberglass is applied as a fluid, the contacting fiberglass layer 16 securely bonds to the outer, metal layer 20 of the PVDF polymer sheet. Alternatively, a covering sheet of fiberglass can be directly bonded, e.g., using an epoxy cement, to the PVDF polymer sheet.

In any event, for completely hermetically encapsulating the piezoelectric element 10, the piezoelectric element preferably does not cover the entire surface of the fiberglass wall 14, and the final fiberglass layer 16 overlaps the edges 22 for direct contacting and firm bonding of the covering fiberglass layer to the fiberglass wall 14 underlying the piezoelectric element.

By way of example, the PVDF polymer layer 12 can have a thickness of around 1 mm, and the metallic electrodes 18 and 20 can have a thickness of around 1 μm. As mentioned, PVDF polymer piezoelectric electroded sheets are commercially available. Also, they are available with various thicknesses and various metal electrodes.

In other applications, e.g., in crafts having hulls of wood or metal, the piezoelectric element, preferably in the form of an electroded sheet, is applied directly onto an outer surface of the hull and hermetically encapsulated.

Fiberglass is a suitable encapsulating material and adheres well to many materials. Additionally, other known encapsulating materials, e.g., lead paints, can be used to coat and hermetically seal the piezoelectric sheet from the water.

Another suitable protective material is a layer of the same PVDF polymer used in the piezoelectric element. As previously noted, such PVDF polymers are chemically inert and can be immersed in sea water for extended time periods without degradation. A particular advantage of using such a PVDF protective coating is that multilayer PVDF polymer sheets 28 (see FIG. 3) are commercially available with layers 30, 32 of polymer and electrodes 34, 36 and 38 alternating with each other. An advantage of multiple layered piezoelectric structures is that more efficient conversion of mechanical energy to electrical energy is obtainable.

Figure 2:
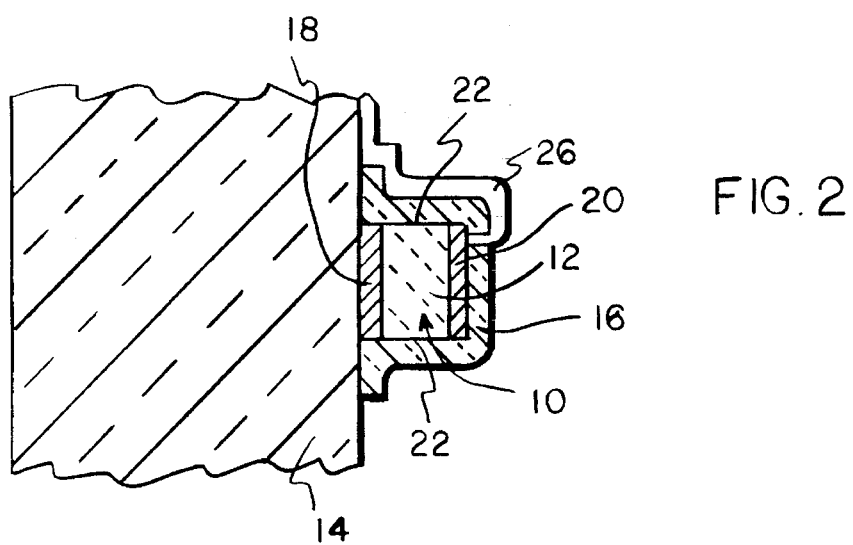
FIG. 2 is a cross section taken through the wall of the hull along line 2—2 of FIG. 1.
Figure 3:
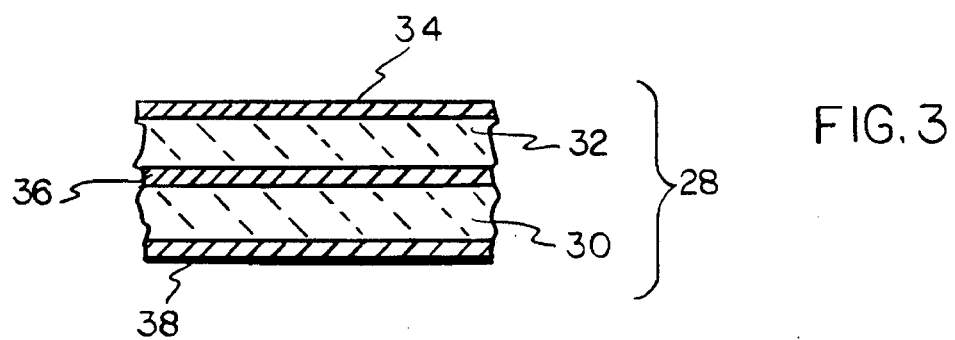
FIG. 3 is a cross-sectional view of a commercially available laminated piezoelectric material sheet.

For use in accordance with this invention, one of the outer electrodes, i.e., electrode 34 of the commercially available laminate sheet 28 shown in FIG. 3 is omitted, and the thus exposed polymer layer 32 of the sheet 28 serves as the outer protective layer 16 of the piezoelectric element 10 shown in FIG. 2.

Figure 4:
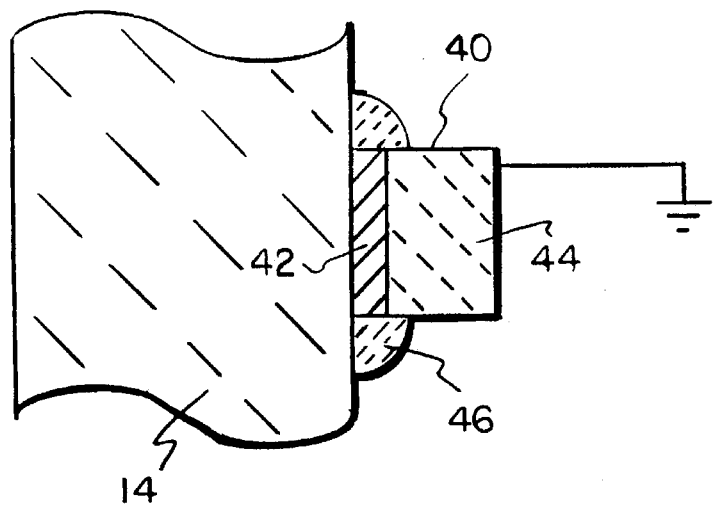
FIGS. 4, 5 and 6 are views similar to FIG. 2 but showing different electrode arrangements for the piezoelectric generator.
Figure 5:
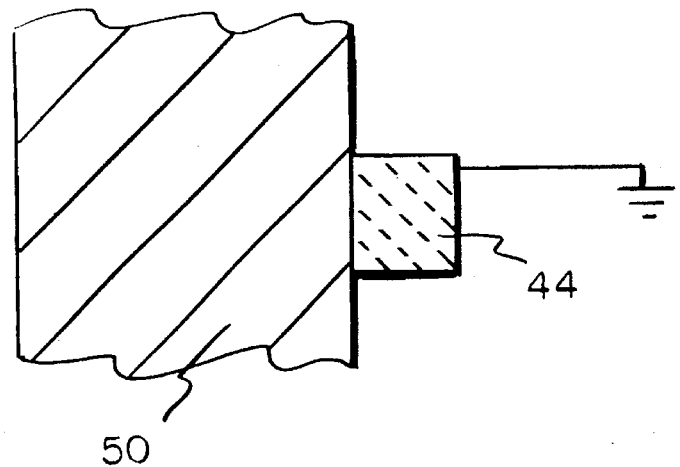

A further advantage of the use of a polymer layer (e.g., layer 32 in FIG. 3) as the outer, hermetically sealing, protective layer, is that, in crafts used in salt water, the salt water itself can comprise an electrode. In such case, as shown in FIG. 4, the piezoelectric element 40 comprises but one (inner) electrode 42 and a polymer layer 44 which serves the dual function of generating electrical energy and hermetically encapsulating the inner electrode 42. Because the surrounding salt water functions as the outer electrode of the piezoelectric element 40, completion of an electric circuit including the piezoelectric element requires the provision of an electrode from the craft extending into the water to form a complete circuit. Also, an encapsulant material is applied as a bead 46 for hermetically encapsulating the peripheral edges of the piezoelectric element. Where the hull 50 (FIG. 5) is of metal, even the inner metallic electrode shown in FIG. 4 can be omitted.

Figure 6:
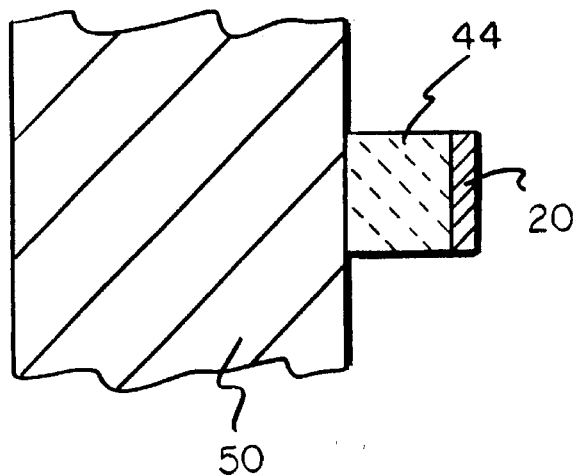

Thus, depending upon the craft hull material and the water in which the craft is used, the piezoelectric element can comprise solely a layer of a piezoelectric material (FIG. 5, metal hull, salt water use), or a piezoelectric material layer in combination only with an inner metallic layer (FIG. 4, non-metallic hull, salt water), or a piezoelectric material layer with an outer metallic layer (FIG. 6, metal hull, fresh water).

In use of the piezoelectric element on a water craft, the two electrodes (however constituted) contacting the opposite surfaces of the piezoelectric material layer are electrically connected to a known type of electrical device for collecting and storing electrical energy generated by the piezoelectric element. As known, piezoelectric elements of the type described generate electrical energy in response to mechanically induced vibrations which cause alternating straining and destraining of the piezoelectric material.

In a water craft, the hull vibrates in response to bouncing contacts of the hull with the water and in response to passing turbulent water, particularly at the stern of the craft. Such mechanical vibrations of the hull are transmitted to a piezoelectric element mounted on or in the hull wall, in accordance with this invention, whereby alternating current electrical energy is generated by the piezoelectric element.

The amount of energy generated is a function of the amplitude of vibrations and the volume of the piezoelectric material being vibrated. The amplitude of the a.c. generated voltage is a function of the thickness of the piezoelectric material sandwiched between the electrodes. The electrical characteristics of various piezoelectric materials are well known.

A suitable electrical device for absorbing and storing the generated electrical energy is a combination of an a.c. to d.c. rectifier and a voltage amplifier for generating a voltage output suitable for trickle charging a d.c. battery. Such devices are known or can be readily designed and so indicated, schematically in FIG. 1, by a box 25 connected to terminals 24 and 26.

As mentioned, mechanical vibrations are induced by, among other things, turbulent water flow. Normally, and usually preferably, the surface of a water craft hull exposed to the water is quite smooth. This is desirable for streamlining and reduced water drag. However, to the extent that the water flows perfectly smoothly across the hull surface, little water turbulence is produced. It is possible, however, to increase the water turbulence along the hull surface while not significantly altering the streamlining thereof.

Figure 7:
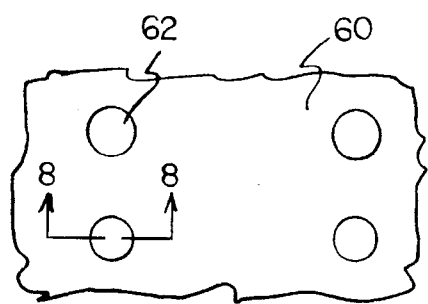
FIG. 7 is a plan view of a segment of an electroded piezoelectric material sheet having protruding bubbles.
Figure 8:
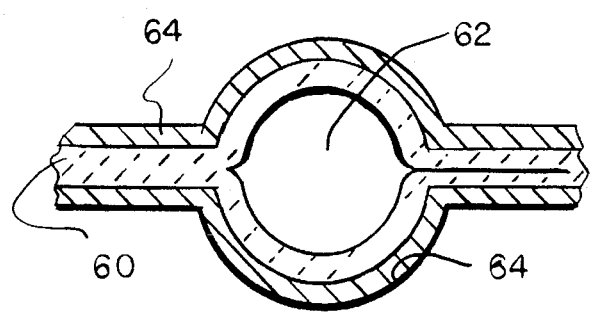
FIG. 8 is a cross-section on an enlarged scale, of one of the bubbles shown in FIG. 7.

An example of this is illustrated in FIGS. 7 and 8 which show a piezoelectric sheet 60 provided with spaced apart, hermetically sealed pockets 62 of air. As such, the sheet 60 is quite similar to commercially available bubbled plastic sheets commonly used as filler in shipping packages. The air pockets (or "bubbles") greatly enhance the compressibility of the sheets for absorbing mechanical energy for protecting packaged products from mechanical damage. Similarly, in piezoelectric elements in accordance with this invention, the greater absorption of mechanical energy provided by the pockets (which preferably contain air, or other compressible substances) is accompanied by a corresponding flexure of the polymer material forming the walls of the pockets. Also, the protruding bubbles 62 in the sheet 60 disrupt the smooth flow of the water past the water craft thereby inducing water turbulence for causing flexing of the sheet. The sizes and spacings of the bubbles can be varied to provide varying degrees of water turbulence and varying amounts of generated electrical energy at given craft speeds. Thus, depending upon how a craft is normally used, a selected tradeoff can be made between greater or lesser turbulence and corresponding lesser or greater streamlining.

Figure 9:
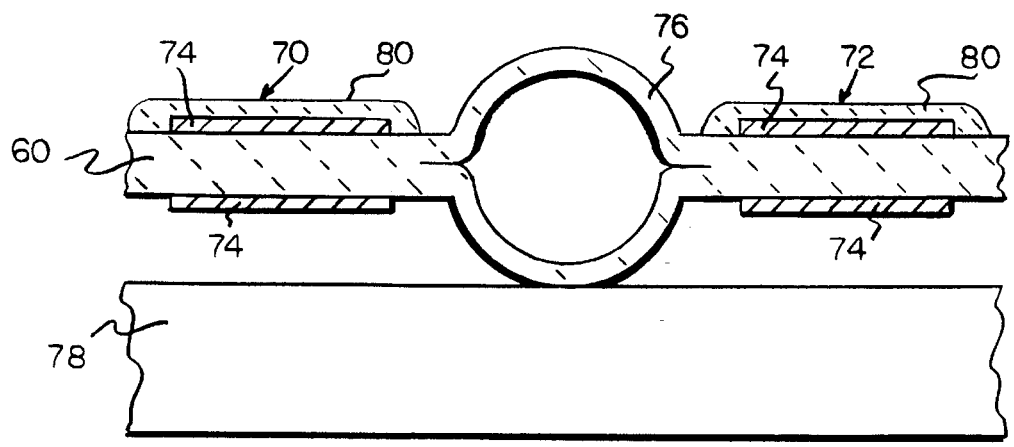
FIG. 9 is a view similar to FIG. 8, but on an even lager scale, showing the mounting of a bubbled sheet on a hull.

While FIG. 8 shows layers of metal overlying a bubble 64, this may be difficult to achieve in manufacture. An alternative arrangement is shown in FIG. 9 where, with a common layer 60 of a plastic-like material, e.g., the aforedescribed PVDF polymers, piezoelectric elements 70 and 72, including metal electrodes 74, are spaced apart by non-electroded, bubbled sections 76 (only one shown) of the layer. For allowing free flexure of the layer 60, the layer 60 is spaced from the underlying supporting hull 78 by the bubbles 76. Also, the outer metal electrodes are covered with an encapsulating material layer 80, e.g., fiberglass on the PVDF polymer itself. Also, in salt water use, the outer metal electrodes can be omitted, as previously described.

Figure 10:
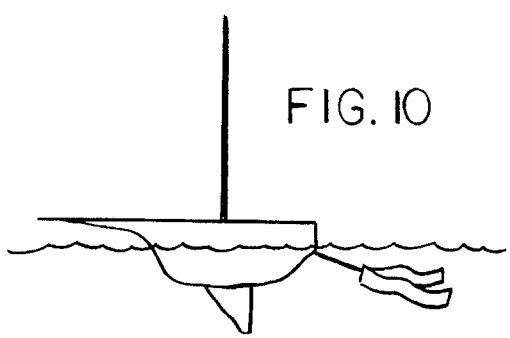
FIG. 10 shows an embodiment of the invention comprising elongated strips of electroded sheets of piezoelectric material towed behind a water craft.

In the embodiments illustrated in FIG. 9, the bubbled piezoelectric elements 70 and 72 are mounted on the hull 78 (or other submerged surface) of a water craft. Alternatively, as shown in FIG. 10, elongated strips 82 of the bubbled piezoelectric elements can be towed behind or below the craft for fluttering vibrations in response to the passing water.

In the wake of the craft, the elongated piezoelectric strips need not be bubbled because of the naturally occurring water turbulence. An advantage of the bubbled material, however, is that the bubbles induce turbulence even in normal laminar or smooth fluid flowing environments. Thus, the bubbled elements can be used when the water craft is moored but within moving water, e.g., in tidal waters or rivers.

Figure 11:
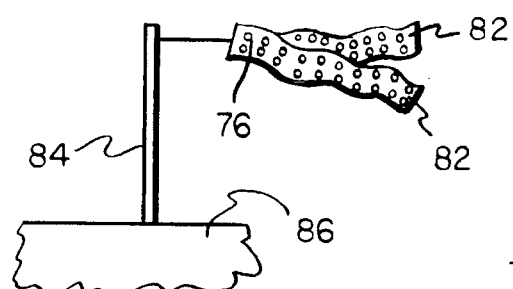
FIG. 11 is similar to FIG. 10 but showing the elongated strips mounted on a mast on a water craft.

Further, the moving fluid need not be water, but any flowing fluid, particularly, in connection with water crafts, the surrounding air. As shown in FIG. 11, elongated, flexible strips 82 of electroded piezoelectric material are mounted on a mast 84 or the like on a water craft 86. The elongated strips 82 flap in the wind, and bubbles are not essential. However, the presence of bubbles increases the degree of flexure of the strips in response to the passing air, hence increases the energy output from the strips.

What is claimed is:

1. A generator for generating electrical energy in response to being disposed within a moving fluid, the generator comprising a flexible, electroded sheet of piezoelectric material, said sheet having oppositely disposed major surfaces, and spaced apart protrusions on one of said surfaces for inducing turbulence in the fluid passing said one surface.

2. A generator according to claim 1 wherein said protrusions comprise gas containing pockets.

3. A system for generating electrical energy on a water craft having a hull portion submerged during use of the craft in a body of water, a piezoelectric generator mounted on said hull portion for generating electrical energy in response to movement of said craft through the water, said generator comprising a layer of a piezoelectric material mounted on said hull portion, electrodes on oppositely disposed surfaces of said layer, and said layer including spaced apart protrusions for interacting with water moving past said layer for inducing vibrations of said layer and the generation of electrical energy thereby.

4. A system according to claim 3 wherein said hull portion comprises a wall, said oppositely disposed surfaces of said layer face respectively inwardly towards and away from said wall, and said protrusions are disposed on said inwardly facing surfaces for spacing portions of said generator from said wall.

5. A system according to claim 3 wherein said hull portion comprises a wall, said surfaces of said layer face respectively inwardly towards and away from said hull, and said protrusions are disposed on said outwardly facing surface for providing direct contact with water moving past said craft.

6. A system according to claim 3 wherein said generator comprises a plurality of individual, spaced-apart power generating elements.

7. A system according to claim 6 wherein each of said elements is defined by a pair of oppositely disposed electrodes and a portion of said layer sandwiched between said electrode pair.

8. A system according to claim 7 wherein said power generating elements are spaced apart by said protrusions.

9. A system according to claim 7 wherein said protrusions are formed of non-electroded piezoelectric material.

* * * * *